United States Patent
Balduin et al.

(10) Patent No.: US 9,452,662 B2
(45) Date of Patent: *Sep. 27, 2016

(54) METHOD AND DEVICE FOR BENDING SHEETS

(75) Inventors: Michael Balduin, Alsdorf (DE); Benno Dunkmann, Liege (BE); Jean-Marie Le Ny, Gemmenich (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 318 days.

This patent is subject to a terminal disclaimer.

(21) Appl. No.: 13/990,409

(22) PCT Filed: Dec. 8, 2011

(86) PCT No.: PCT/EP2011/072169
§ 371 (c)(1),
(2), (4) Date: Aug. 7, 2013

(87) PCT Pub. No.: WO2012/080071
PCT Pub. Date: Jun. 21, 2012

(65) Prior Publication Data
US 2013/0307286 A1 Nov. 21, 2013

(30) Foreign Application Priority Data
Dec. 13, 2010 (EP) .................................. 10194712

(51) Int. Cl.
*C03B 23/023* (2006.01)
*B60J 1/00* (2006.01)
(Continued)

(52) U.S. Cl.
CPC ............ *B60J 1/008* (2013.01); *C03B 23/0066* (2013.01); *C03B 23/0252* (2013.01); *C03B 23/0357* (2013.01)

(58) Field of Classification Search
None
See application file for complete search history.

(56) References Cited

U.S. PATENT DOCUMENTS

| 3,114,571 | A | 12/1963 | Carson et al. |
| 5,285,660 | A | 2/1994 | Petitcollin et al. |

(Continued)

FOREIGN PATENT DOCUMENTS

| CN | 1768011 A | 5/2006 |
| CN | 101094817 A | 12/2007 |

(Continued)

OTHER PUBLICATIONS

PCT Written Opinion mailed on Feb. 27, 2012 for PCT Application PCT/EP2011/072492 filed on Dec. 12, 2011 in the name of Saint-Gobain Glass France (English+German Version).
PCT Written Opinion mailed on Feb. 27, 2012 for PCT Application PCT/EP2011/072169 filed on Dec. 8, 2011 in the name of Saint-Gobain Glass France (English+German Version).
PCT Written Opinion mailed on Mar. 6, 2012 for PCT Application PCT/EP2011/072170 filed on Dec. 8, 2011 in the name of Saint-Gobain Glass France (English+German Version).

(Continued)

*Primary Examiner* — Lisa Herring
(74) *Attorney, Agent, or Firm* — Steinfl & Bruno, LLP

(57) ABSTRACT

A method for bending a sheet is described. The method includes the following steps: a) at least one sheet is inserted into a pre-bending ring with a movable bending ring holder, the at least one sheet is heated at least to an approximately softening temperature, and the at least one sheet is prebent in the pre-bending ring to 5% to 50% of a final edge bending, b) the pre-bent sheet is lifted out of the pre-bending ring by means of a suction device and is bent further, beyond a bending obtained in the pre-bending ring, c) the at least one sheet is laid down by means of the suction device in a final-bending ring on the movable bending ring holder and the at least one sheet is bent to a final bending, and d) the at least one sheet is cooled down in the final-bending ring and the at least one sheet is bent by means of the suction device to 100% to 130% of an overall final edge bending.

11 Claims, 4 Drawing Sheets

Figure 1:
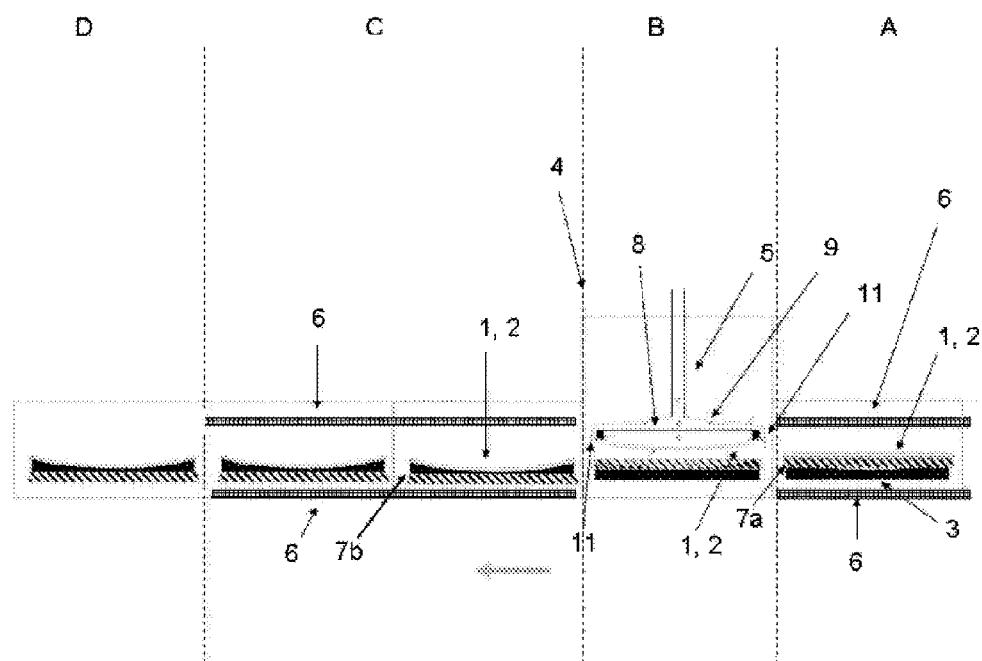

(51) Int. Cl.
  *C03B 23/025* (2006.01)
  *C03B 23/035* (2006.01)
  *C03B 23/00* (2006.01)

(56) References Cited

U.S. PATENT DOCUMENTS

| | | | |
|---|---|---|---|
| 5,713,976 | A | 2/1998 | Kuster et al. |
| 6,076,373 | A | 6/2000 | Grodziski |
| 6,138,477 | A | 10/2000 | Morin |
| 7,231,787 | B2 | 6/2007 | Neuman et al. |
| 7,302,813 | B2 | 12/2007 | Balduin et al. |
| 8,146,387 | B2 | 4/2012 | Ollfisch et al. |
| 8,327,667 | B2 | 12/2012 | Balduin et al. |
| 8,978,418 | B2 | 3/2015 | Balduin et al. |
| 2002/0117250 | A1 | 8/2002 | Veerasamy |
| 2005/0142332 | A1 | 6/2005 | Sauer |
| 2007/0157671 | A1 | 7/2007 | Thellier et al. |
| 2008/0134721 | A1 | 6/2008 | Maeda |
| 2008/0134722 | A1 | 6/2008 | Balduin et al. |
| 2008/0190143 | A1 | 8/2008 | Balduin et al. |
| 2009/0277440 | A1 | 11/2009 | Angel et al. |
| 2010/0236290 | A1 | 9/2010 | Fukami et al. |
| 2010/0257900 | A1 | 10/2010 | Yajima et al. |
| 2014/0011000 | A1* | 1/2014 | Dunkmann ............ B60J 1/008 428/174 |

FOREIGN PATENT DOCUMENTS

| | | | |
|---|---|---|---|
| CN | 101155762 | A | 4/2008 |
| DE | 4337559 | | 3/1995 |
| DE | 10314266 | | 6/2004 |
| DE | 102005001513 | | 6/2006 |
| DE | 102007059323 | | 6/2009 |
| EP | 0677491 | | 10/1995 |
| EP | 1358131 | | 11/2003 |
| EP | 1371616 | | 12/2003 |
| EP | 2233444 | | 9/2010 |
| JP | 7-187691 | A | 7/1995 |
| JP | 2008526659 | A | 7/2008 |
| JP | 2008526680 | A | 7/2008 |
| KR | 10-2007-0088745 | A | 8/2007 |
| KR | 10-2007-0094622 | A | 9/2007 |
| WO | 02064519 | | 8/2002 |
| WO | 2010/074548 | | 7/2010 |
| WO | 2010136702 | | 12/2010 |
| WO | 2010136702 | A1 | 12/2010 |
| WO | 2012080071 | | 6/2012 |
| WO | 2012080072 | | 6/2012 |

OTHER PUBLICATIONS

Non-Final Office Action for U.S. Appl. No. 13/990,399, filed Aug. 9, 2013 in the name of Michael Balduin. Mail date: May 1, 2014.
Notice of Allowance for U.S. Appl. No. 13/990,399, filed Aug. 9, 2013 in the name of Michael Balduin. Mail date: Nov. 7, 2014.
Restriction Requirement for U.S. Appl. No. 14/015,850, filed Aug. 30, 2013 in the name of Michael Balduin. Mail date: Feb. 28, 2014.
Non-Final Office Action for U.S. Appl. No. 14/015,850, filed Aug. 30, 2013 in the name of Michael Balduin. Mail date: Apr. 18, 2014.
Final Office Action for U.S. Appl. No. 14/015,850, filed Aug. 30, 2013 in the name of Michael Balduin. Mail date: Oct. 23, 2014.
PCT International Search Report mailed on Feb. 27, 2012 for PCT Application PCT/EP2011/072492 filed on Dec. 12, 2011 in the name of Saint-Gobain Glass France.
PCT International Search Report mailed on Feb. 27, 2012 for PCT Application PCT/EP2011/072169 filed on Dec. 8, 2011 in the name of Saint-Gobain Glass France.
PCT International Search Report mailed on Mar. 6, 2012 for PCT Application PCT/EP2011/072170 filed on Dec. 8, 2011 in the name of Saint-Gobain Glass France.
Restriction Requirement issued for U.S. Appl. No. 13/990,391 filed in the name of Benno Dunkmann on Aug. 8, 2013. Mail date: Oct. 21, 2015.
Non-Final Office Action issued for U.S. Appl. No. 14/015,850 filed in the name of Michael Balduin on Aug. 30, 2013. Mail date: Oct. 21, 2-15.
Non-Final Office Action for U.S. Appl. No. 13/990,391, filed Aug. 8, 2013 on behalf of Benno Dunkmann. Mail Date: Feb. 23, 2016. 25 pages.
Final Office Action for U.S. Appl. No. 14/015,850, filed Aug. 30, 2013 on behalf of Michael Balduin. Mail Date: Mar. 25, 2016. 16 pages.
English Translation of Notice of Rejection for Japanese Patent Application No. 2013-542538. Mail Date: Aug. 12, 2014. 5 pages.
English Translation of Notice of Rejection for Japanese Patent Application No. 2013-542539. Mail Date: May 20, 2014. 3 pages.
English Translation of First Office Action for Chinese Patent Application No. 201180059848.6 filed Dec. 8, 2011 on behalf of Saint-Gobain Glass France. Mail Date: Nov. 25, 2014. 11 pages.
English Translation of Mexican Office Action for Mexican Patent Application No. MX/a/2013/006560. Mail Date: Oct. 16, 2015. 1 page.
English Translation of Mexican Office Action for Mexican Patent Application No. MX/a/2013/006559. Mail Date: Jul. 24, 2015. 4 pages.
English Translation of Mexican Office Action for Mexican Patent Application No. MX/a/2013/006688. Mail Date: Feb. 24, 2016. 3 pages.

\* cited by examiner

METHOD AND DEVICE FOR BENDING SHEETS

CROSS REFERENCE TO RELATED APPLICATIONS

The present application is the US national stage of International Patent Application PCT/EP2011/072169 filed on Dec. 8, 2011 which, in turn, claims priority to European Patent Application EP 10194712.5 filed on Dec. 13, 2010.

The invention relates to a method and a device for bending panes, a furnace for bending panes, and the use of the furnace.

Besides aspects of the equipment, the development of new motor vehicles is also determined to a large extent by design elements. In this, the significance of windshield design is increasing because of the large, highly visible area. In this regard, not only the appearance of the windshield, but also aspects for energy conservation and environmental impact play a role. Powerful microprocessors as well as CAD (Computer-Aided Design) supported software packages also enable greater adaptation and optimization of the aerodynamic resistance of the windshield. For this reason, modern windshields in motor vehicles have increasingly complex shapes. In particular, motor vehicles with very low fuel consumption but also sports cars make high demands on pane geometry and thus also on the glass pane bending methods necessary for their implementation. The bending of a glass pane can be realized, for example, through a combination of gravity bending and press bending. One or a plurality of glass panes are placed in a bending ring and heated. In this process, the glass pane is bent along the geometry predefined by the bending ring with the help of gravity acting on the heated glass pane. Then, the heated glass is bent into the corresponding shape with the help of negative pressure and a suitable frame.

More complex geometries cannot usually be realized with a single bending process. This is rendered more difficult by the fact that separate or subsequent bending processes cannot be combined arbitrarily. These factors clearly limit the possibilities of obtaining the pane geometries sought.

EP 0 677 491 A2 discloses a method for bending and tempering glass panes. The glass panes are heated to their softening temperature, pressed between two complementary shapes in a device, and then transferred into a transport ring. The panes are then tempered and cooled in the transport ring.

EP 1 371 616 B1 discloses a device for bending and tempering glass panes. The device comprises, among other things, successive mold carriers, preheating sections for heating glass panes to bending temperature, a gravity-based pre-bending section, a bending section with a press mold, and a cooling section.

EP 1 358 131 B1 discloses a method for bending of glass panes in pairs. For this, the pair of glass panes is pre-bent in a horizontal position on a bending mold in the form of a frame by gravitational bending. Then, the pre-bent pair of glass panes is further bent with an entire surface bending mold.

US 2008/0134722 A1 discloses a method and a device for bending superposed panes. The panes are lifted by a suction mold and pressed by an opposing mold and bent according to the geometry.

DE 10 2005 001 513 B3 discloses a device and method for bending glass panes. The device for bending a glass pane comprises, in addition to a loading zone, a furnace section, a transfer station, and a final cooling section.

DE 103 14 266 B3 discloses a method and device for bending glass panes. In the method, the glass panes are pre-bent in a horizontal position on a bending mold in the form of a frame by gravitational bending and then further bent using a final bending mold.

The object of the present invention is to provide a method for bending panes that enables even the bending of complex geometries quickly and with minimal energy consumption in the least possible process steps.

The method for bending panes according to the invention comprises a first step, wherein at least one pane, preferably a first pane and a second pane, are placed in a pre-bending ring on a movable bending ring holder. The method is suitable for both one pane and for the bending of panes in pairs. The pre-bending ring preferably has a mean final bend of the edge of 5% to 50%. The movable bending ring holder then moves into a furnace and the panes are heated in the pre-bending ring by a heating device at least to the softening temperature of the glass, preferably 550° C. to 800° C. The softening temperature is determined by the composition of the glass. The panes placed in the pre-bending ring are pre-bent through the action of gravity to 5% to 50% of the local final bend of the edge. In the context of the invention, the term "final bend of the edge" is the mean (final) bend in the final, finished state of at least a part of the edge of the pane or bending ring edge with a dimension or length of at least 30% of the total bending ring edge or pane edge. The panes are lifted in the next step by a suction device and bent further beyond the bending obtained in the pre-bending ring. The panes are preferably bent to 102% to 130% of the final bend of the edge. The bending takes place over a counter framework situated in the suction device. The counter framework preferably has the shape of a ring with a protruding, bent contact surface. The suction device includes, in addition to the counter framework, a cover with an air baffle surrounding the counter framework. The air baffle is situated adjacent the lifted pane and is designed such that, during the bending on the contact surface of the counter framework, the pane is at a distance of 3 mm to 50 mm from the air baffle. This distance enables continuous suction of air in the intermediate space between the pane and the air baffle. The air sucked in generates a negative pressure for fixing the pane on the contact surface. The suction process bends the panes corresponding to the bend (curvature) of the contact surface. The contact region of the molded part, in particular the contact surface with the pane, is preferably lined with a flexible or soft material. This material preferably includes fire resistant fibers of glass, metal, or ceramic, and prevents damage such as scratches on the panes. A description of the mode of operation and structure of the suction device for lifting the pane is found in US 2008/0134722 A1, [0036] and through [0040] as well as claim 1 a). The panes are then placed by the suction device in a final bending ring on the movable bending ring holder. The final bending ring preferably has at least a 30% larger mean final bend of the edge than the pre-bending ring. The placement of the panes can take place, for example, by raising the suction pressure by means of a pressure drop in the suction device. The pre-bending ring and the final bending ring are, in each case, bent corresponding to the intended pane geometry. The circumference and the opening angle of the bending ring are adapted to the geometry of the pane to be bent. The pre-bending ring and the final bending ring are preferably disposed on the same movable bending ring holder and can, for example, be converted by removal of a pin or a bracket from the pre-bending ring into the final bending ring. In the context of the invention, the term "convert" means both the changing of the shape (geometry) of the bending ring from the pre-bending ring to the final bending ring and a taking off of the pre-bending ring as well as "making accessible" a final bending ring disposed beneath the pre-bending ring. In a final step, the panes are bent by gravity to the final bend on the final bending ring.

The pane is preferably then cooled.

The pane is preferably heated to a temperature of 500° C. to 750° C., particularly preferably 580° C. to 650° C.

The suction device preferably builds a suction pressure of 1 kg/m² to 100 kg/m². This suction pressure is sufficient to securely fix the pane on the suction device and to bend it over the counter framework.

The pane preferably includes glass, particularly preferably flat glass (float glass), quartz glass, borosilicate glass, and/or soda lime glass.

The pane is preferably pre-bent by gravity in the pre-bending ring to 10% to 30% of the mean final bend.

The pane is preferably lifted by the suction device and bent to 100% to 130%, preferably to 105% to 120% of the mean overall final bend of the edge. The term "overall final bend of the edge" refers to a uniform bending of the entire pane expressed as a percentage. The pane is preferably shaped on a bending ring (counter framework) in the suction device such that it has a bend of the edge that exceeds, in shape or extent, the amount of the final bend of the edge.

The pane is preferably bent by the suction device with a locally different final bend of the edge. The term "local final bend of the edge" refers to a nonuniform (final) bend (of the edge) of the entire pane expressed as a percentage.

The pane is preferably bent locally in the suction device by a stream of air or a lower bending ring. The term "locally" means individual regions of the pane, in which an additional bend is set by a stream of air, preferably from a nozzle. Alternatively, the local bending described can occur by means of a bending ring applied from below. Thus, even complex geometries can be produced.

The pane is preferably heated by a temperature gradient on the glass surface with a maximum of 0.05 K/mm to 0.5 K/mm, preferably 0.1 K/mm to 0.2 K/mm. The adjustment of the temperature gradient takes place preferably via heating devices differently controlled (i.e., different amounts of radiated heat) and placed above or below the panes.

Preferably, two panes are bent as described above. The method according to the invention and the device according to the invention described in the following are preferably suited for bending panes in pairs.

The invention further comprises a pane, in particular a pair of panes, bent with the method according to the invention.

The invention further comprises a furnace for bending panes, preferably for bending panes in pairs. The furnace comprises at least one heating device installed in the furnace and a bending ring holder movable inside and outside the furnace with a bending ring as a pre-bending ring and/or final bending ring. The bending ring is preferably adjustable or convertible both as a pre-bending ring and a final bending ring. The pre-bending ring and the final bending ring can, for example, be converted by the removal of a pin or a bracket from the pre-bending ring into the final bending ring. In the context of the invention, the term "convert" means both the changing of the shape (geometry) of the bending ring from the pre-bending ring to the final bending ring and a taking off of the pre-bending ring as well as "making accessible" a final bending ring disposed beneath the pre-bending ring. Inside a preheating region, the panes (first pane and/or second pane) are heated to a softening temperature. A first, vertically displaceable, preferably convexly bent suction device is connected to the preheating region in the bending region. The suction device enables picking up the panes out of the pre-bending ring, bending the pane, and placing the pre-bent pane back on the final bending ring. The suction device comprises at least one counter framework with a bent contact surface. The bend of the contact surface is preferably greater than the bend of the pre-bending ring; preferably the bend of the contact surface is at least 30%, particularly preferably at least 90%. The counter framework is surrounded by a cover with an air baffle and there is a minimum distance of 3 mm to 50 mm between the contact surface and the air baffle. The air baffle protrudes downward beyond the lowest point of the bent contact surface. An intermediate region for heating or tempering the panes situated on the movable bending ring connects to the suction device. A cooling region connects to the intermediate region. The cooling region forms the final portion of the furnace according to the invention. The preheating region, bending region, heating region, and the cooling region are disposed connected to each other in succession and have, in the process direction, heating devices for heating the regions. The heating devices can be installed above, beside, or even under the movable bending ring holder.

The movable bending ring holder is preferably moved by a transport device situated inside and outside the furnace.

The heating device preferably includes radiant heaters, particularly preferably infrared radiators.

The heating device preferably includes an arrangement of individual separately controllable heating tiles. As a result of the different thermal radiation of the tiles, different temperature regions can be realized on the panes. The different temperature regions enable a gradual heating of the surface of the panes.

The invention further includes the use of the furnace according to the invention for bending panes to be laminated, preferably motor vehicle windshields.

The invention further includes the use of a pane according to the invention as a windshield, preferably as a windshield of a motor vehicle.

In the following, the invention is explained in detail with reference to drawings and an exemplary embodiment as well as a comparative example. The drawings are purely schematic depictions and not to scale. They in no way limit the invention.

Figure 2:
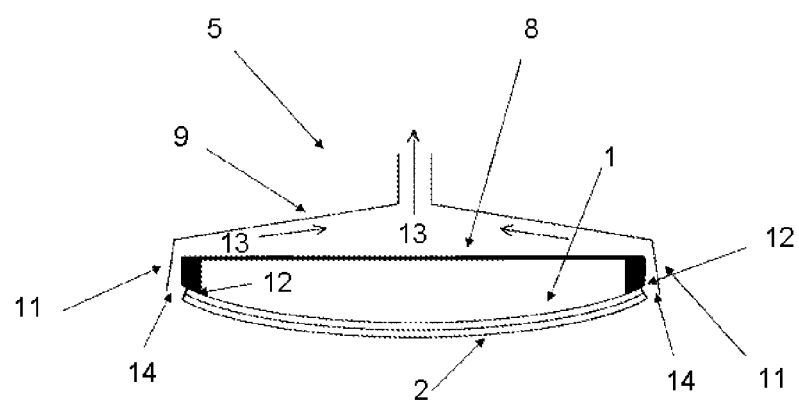
Figure 3:
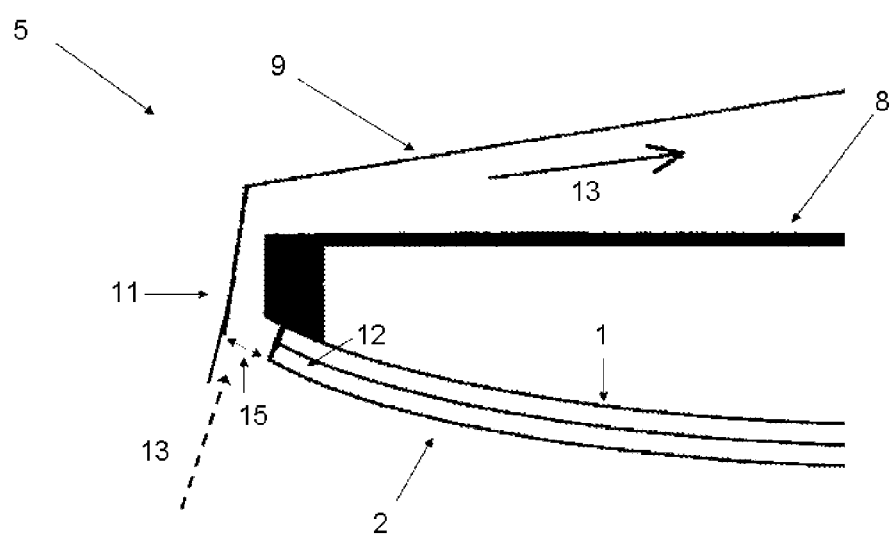
Figure 4:
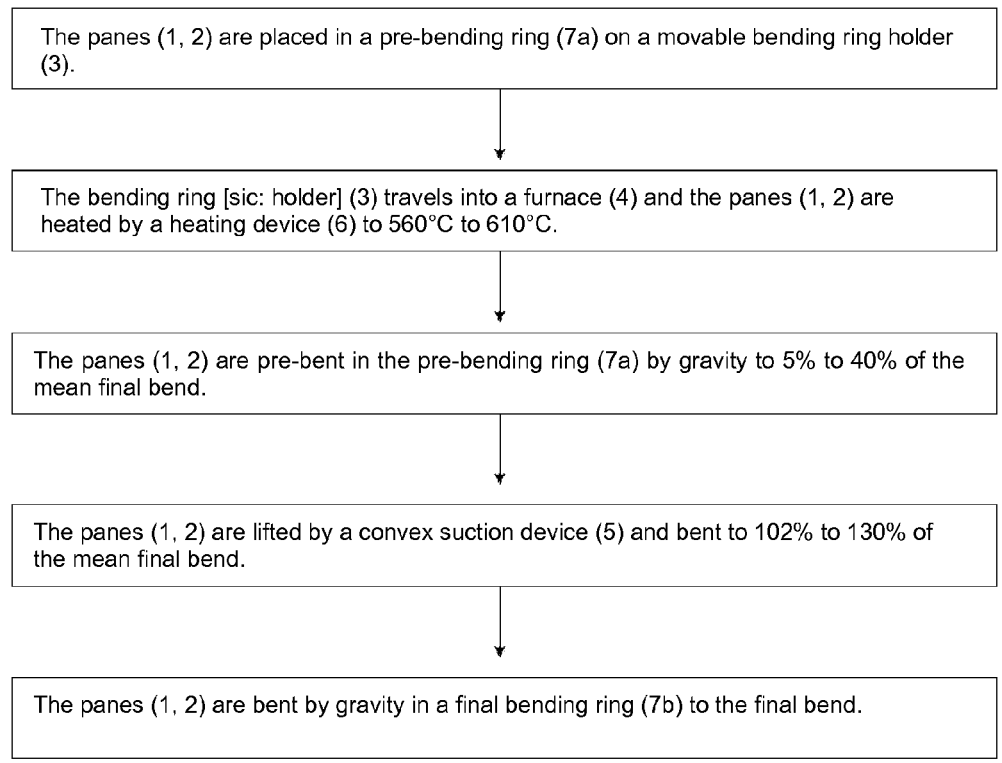

They depict:

FIG. 1 a cross-section of the bending process of the furnace according to the invention, FIG. 2 a cross-section of the suction device, FIG. 3 an enlarged detail of the suction device, and FIG. 4 a flowchart of the method according to the invention.

FIG. 1 depicts a cross-section of the bending process of the furnace (4) according to the invention. The furnace (4) comprises at least one heating device (6) installed inside the furnace (4) and a bending ring holder (3) movable inside and outside the furnace with a pre-bending ring (7a). Inside a preheating region (A), the panes (1, 2) are heated to the softening temperature of the respective glass and bent. In the main bending region (B), a first, vertically displaceable, preferably convexly bent suction device (5) is connected to the preheating region (A). The suction device (5) enables picking up the panes (1, 2) out of the pre-bending ring (7a), bending the panes (1, 2) as well as then placing the bent panes (1, 2) on the final bending ring (7b). Alternatively, placement of the bent panes on the pre-bending ring is also possible. In this manner, the originally pure gravity bending process can be significantly accelerated. The basic structure of the suction device (5) is also described in US 2008/0134722 A1. An intermediate region for tempering (C) and then a region for cooling (D) of the panes (1, 2) situated on the final bending ring (7b) are connected to the suction device (5).

FIG. 2 depicts a cross-section of the suction device (5). The suction device (5) includes a counter framework (8) and a cover (9) surrounding the counter framework (8). The counter framework (8) can be bent over as a whole or locally relative to the final bending ring (7b) (not shown). The counter framework acts as a "negative" relative to the final bending ring (7b). A stream of air (13) is drawn into the suction device (5) over the edge zone (14) between the counter framework (8) and the cover (9). With the help of the resultant negative pressure, the panes (1, 2) are suctioned, lifted, and bent. The contact surface (12) of the counter framework (8) with the second pane (2) is preferably lined with a flexible or soft material, such as fire resistant fibers of glass, metal, or ceramic.

FIG. 3 depicts an enlarged detail of the suction device (5). The suction device (5) comprises a counter framework (8) with a bent contact surface (12). The bend of the contact surface (12) is preferably greater than the bend of the pre-bending ring (7a) not shown in FIG. 3. The counter framework (8) is surrounded by a cover (9) with an air baffle (11) and there is a distance (15) of 2 mm to 50 mm between the contact surface (12) of the counter framework (8) and the air baffle (11). Consequently, after bending by the suction device, the panes (1, 2) have a higher final bend of the edge, preferably a final bend of the edge at least 30% greater than after the pre-bending ring (7a). The distance (15) between the panes (1, 2) and the air baffle (11) is from 5 mm to 50 mm.

FIG. 4 depicts a flowchart of the method according to the invention. Two panes (1, 2) are placed in a pre-bending bending ring (7a) on a movable bending ring (3). The bending ring (3) is then transported into a furnace. The panes (1, 2) are heated by a heating device (6) consisting of radiation heating elements to the softening temperature of the panes (1, 2), roughly 560° C. to 650° C. During the course of the heating of the panes (1, 2), the panes (1, 2) situated in the pre-bending ring (7a) are pre-bent with the help of gravity to 5% to 50% of the mean final bend to be obtained. The heating device preferably comprises an arrangement of individual separately controllable heating tiles. As a result of the different thermal radiation of the tiles, different temperature regions can be realized on the panes (1, 2). The different temperature regions enable a gradual heating of the surface of the panes (1, 2). The panes (1, 2) are then lifted by a preferably convex suction device (5) and bent to 100% to 130% of the mean final bend. In a next step, the panes (1, 2) are placed by the convex suction device (5) on the final bending ring (7b) on the movable bending ring holder (3). The pre-bending ring (7a) and the final bending ring (7b) are in each case bent corresponding to the intended pane geometry. The pre-bending ring (7a) and the final bending ring (7b) are preferably disposed on the same movable bending ring holder (3) and can be converted, by the removal of a pin from the pre-bending ring (7a), into the final bending ring (7b). The panes (1, 2) are then bent by gravity corresponding to the shape of the bending ring (5) to the mean final bend. The panes (1, 2) are then cooled.

LIST OF REFERENCE CHARACTERS (1) first pane
(2) second pane
(3) movable bending ring holder
(4) furnace
(5) suction device
(6) heating device
(7a) pre-bending ring
(7b) final bending ring
(8) counter framework
(9) cover
(10) transport device
(11) air baffle
(12) contact surface
(13) stream of air
(14) edge zone
(15) distance between the contact surface (12) and the air baffle (11)
(A) preheating region
(B) main bending region
(C) tempering region
(D) cooling region

The invention claimed is:

1. A method for bending a pane, comprising:
placing at least one pane in a pre-bending ring with a movable bending ring holder, heating the at least one pane at least to roughly its softening temperature, and pre-bending the at least one pane in the pre-bending ring to 5% to 50% of a final bend of an edge,
lifting the at least one pane out of the pre-bending ring by a suction device and further bending the at least one pane by the suction device to 102% to 130% of the final bend of the edge, wherein the suction device comprises a counter framework, a cover with an air baffle surrounding the counter framework and the at least one pane is at a minimum distance of 3 mm to 50 mm from the air baffle,
placing the at least one pane by means of the suction device in a final bending ring on the movable bending ring holder, and bending the at least one pane to the final bend, and
cooling the at least one pane in the final bending ring.

2. The method according to claim 1, wherein the at least one pane is bent by the suction device to 105% to 120% of the final bend of the edge.

3. The method according to claim 1, wherein the at least one pane is bent by the suction device with a locally different final bend of the edge.

4. The method according to claim 3, wherein the at least one pane is bent locally in the suction device by a stream of air or a lower bending ring.

5. The method according to claim 1, wherein the at least one pane is heated by a temperature gradient on a glass surface with a maximum of 0.05 K/mm to 0.5 K/mm.

6. The method according to claim 1, wherein the at least one pane is heated to a temperature of 500° C. to 750° C.

7. The method according to claim 1, wherein the at least one pane is pre-bent by gravity in the pre-bending ring to 10% to 30% of a local final bend of the edge.

8. The method according to claim 1, wherein the suction device builds a suction pressure of 1 kg/m² to 100 kg/m².

9. The method according to claim 1, wherein two panes are bent.

10. The method according to claim 1, wherein the at least one pane is heated by a temperature gradient on a glass surface with a maximum of 0.1 K/mm to 0.2 K/mm.

11. The method according to claim 1, wherein the at least one pane is heated to a temperature of 580° C. to 650° C.

* * * * *